Nov. 9, 1971 B. WEISSMAN 3,618,212

DENTAL PROSTHETIC CONSTRUCTION

Filed Nov. 19, 1969

INVENTOR.
BERNARD WEISSMAN

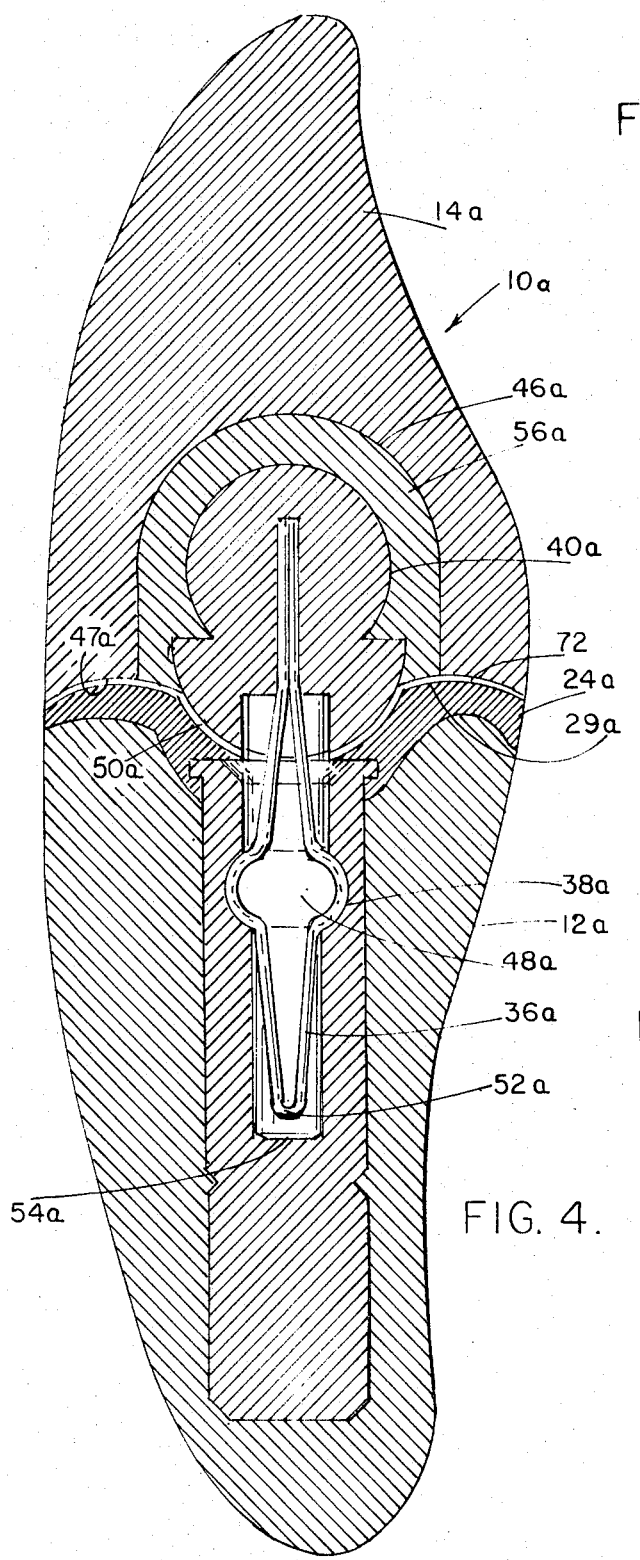
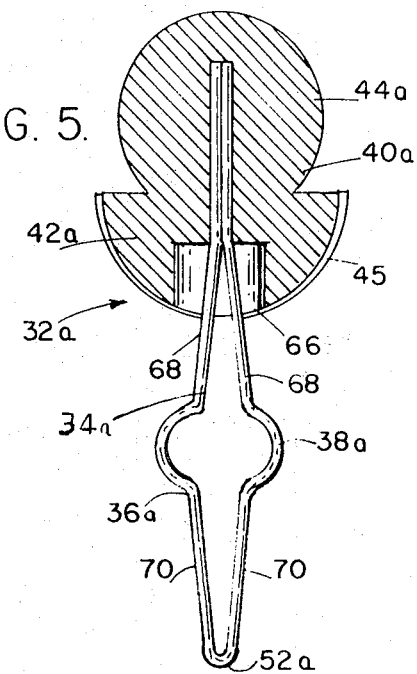
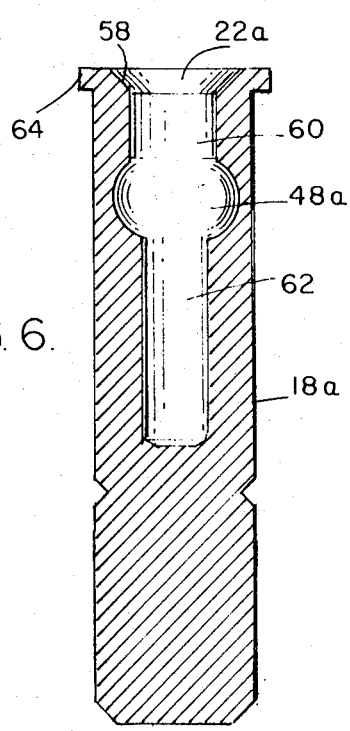

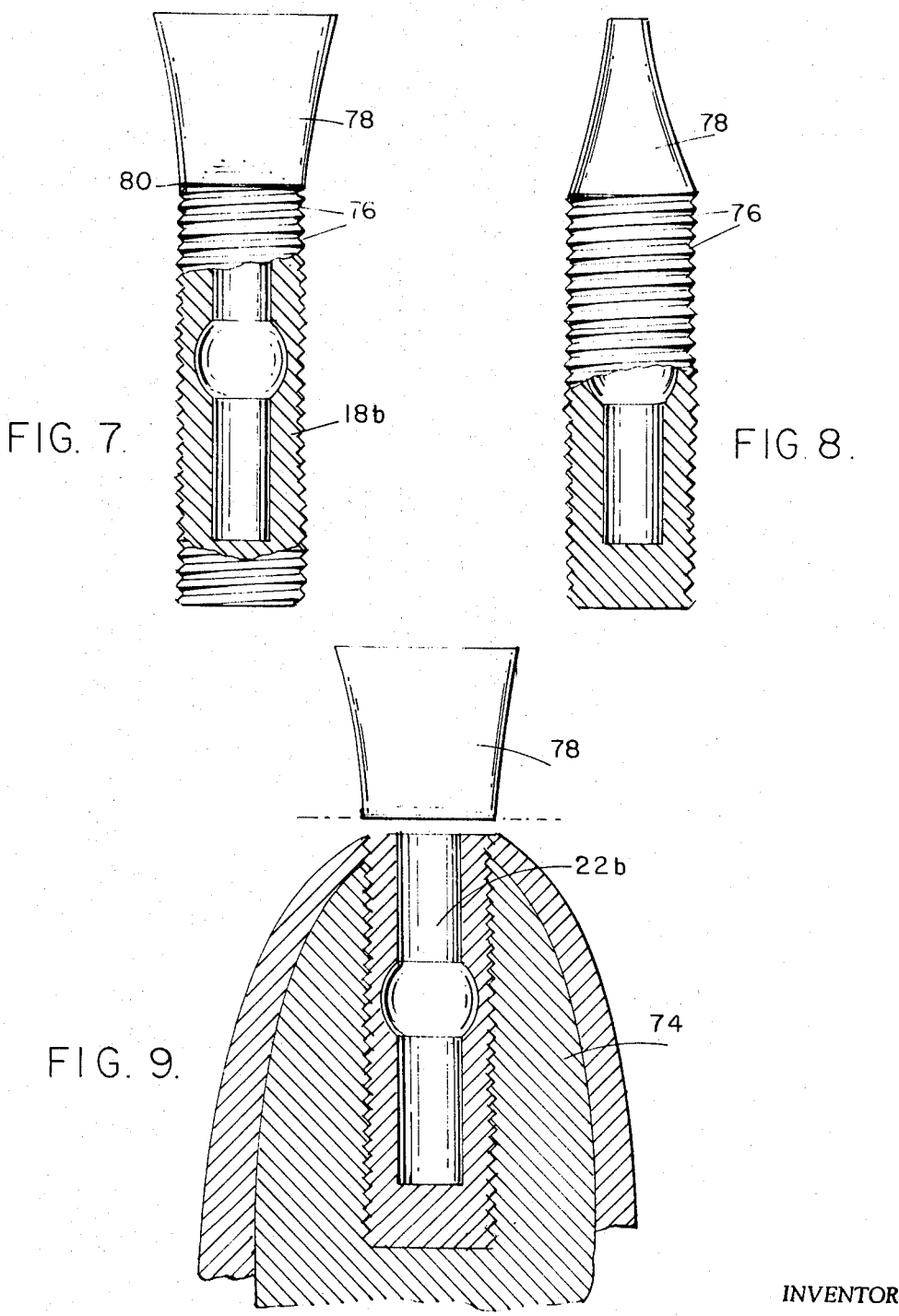

United States Patent Office 3,618,212
Patented Nov. 9, 1971

3,618,212
DENTAL PROSTHETIC CONSTRUCTION
Bernard Weissman, 304 Ashland Place,
Brooklyn, N.Y. 11217
Filed Nov. 19, 1969, Ser. No. 878,101
Int. Cl. A61c *13/00*
U.S. Cl. 32—10 A
22 Claims

ABSTRACT OF THE DISCLOSURE

Apparatus and method for securing a dental prosthetic structure, such as a false tooth, crown or the like, to a patient's tooth stub or jawbone and comprising the drilling of a bore in the tooth stub or jawbone, placing a preformed hollow sleeve having a closed distal end, an open proximal end and an internally bowed intermediate portion, into said bore, forming a saddle conformal with the configuration of said tooth stub including said sleeve as an integral part thereof, positionally securing said saddle with respect to said tooth stub, placing the lower spring portion of an intermediate joinder member within the hollow sleeve, the spring portion having a bowed intermediate part which is urged into said bowed intermediate portion of said sleeve to thereby positionally secure said intermediate joinder member with said prepared tooth stub, the upper portion of said joinder member having an anchoring protuberance thereon, forming a prosthetic structure with an opening in the bottom thereof with the bottom peripheral configuration conformal with that of the prepared tooth stub, and securing said prosthetic structure to said prepared tooth stub by cementing said anchoring protuberance within said opening in said prosthetic structure.

---

The present invention pertains to a new and novel dental prosthetic construction, and more particularly to an apparatus for use in connection with dental prosthetic structures, and to the method by which the construction is connected to a patient's tooth stub or jawbone to permit the prosthetic structure to be secured with respect to said tooth stub or jawbone and to have limited universal movement with respect thereto.

In the construction of a dental prosthetic structure for securement to existing tooth or jaw structure it is necessary that the prosthetic device be firmly secured thereto but it is also desirable that the device have some universal movement to limit the stress and strain forces imparted to the prosthetic device by mastication.

SUMMARY

Accordingly, it is the primary object of the present invention to provide a new and novel dental prosthetic construction which permits a prosthetic structure to be firmly secured to an existing tooth stub or jawbone.

It is another object of the present invention to provide a construction of the aforementioned type which includes the use of substantially preformed standardized members wherein the dental prosthetic structure is specially prepared to cooperate with the standardized members for conformal securement with respect to said existing structure in the patient's mouth.

It is a further object of the present invention to provide a construction of the above type employing a preformed hollow sleeve and a preformed intermediate joinder member having a lower spring portion and an anchoring protuberance on the upper portion thereof which is secured to the spring portion.

BRIEF DESCRIPTION OF THE DRAWINGS

These and other objects, features and advantages of the present invention will become more apparent from the detailed description hereinafter considered in conjunction with the accompanying drawings, wherein

FIG. 4 is a cross-sectional view similar to FIG. 2 depicting another embodiment of the dental prosthetic construction of the present invention;

FIG. 5 is a cross-section elevational view of the intermediate joinder member depicted in FIG. 4;

FIG. 6 is a cross-sectioned elevational view of the hollow sleeve depicted in the construction of FIG. 4;

FIG. 7 is a partial cross-sectioned front elevational view of a hollow sleeve construction comprising a third embodiment of the present invention;

FIG. 8 is a partial cross-sectioned side elevational view of the hollow sleeve shown in FIG. 7, and FIG. 9 is a cross-sectional front elevational view of the sleeve of FIG. 7 positionally secured in a patient's jawbone.

DESCRIPTION OF THE PREFERRED EMBODIMENTS

Figure 1:
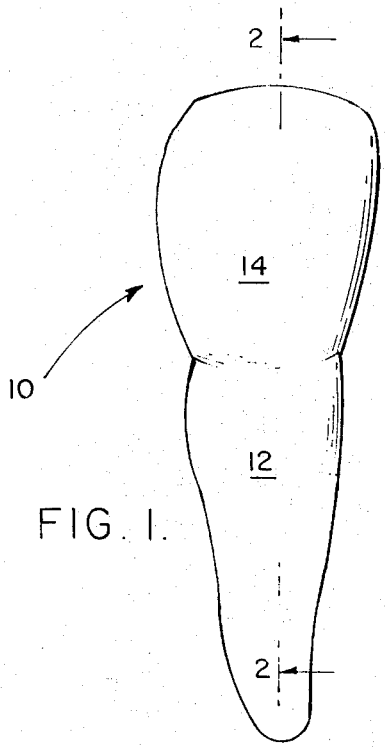
FIG. 1 is a front elevational view of a dental prosthetic construction in accordance with the principles of the present invention.
Figure 3:
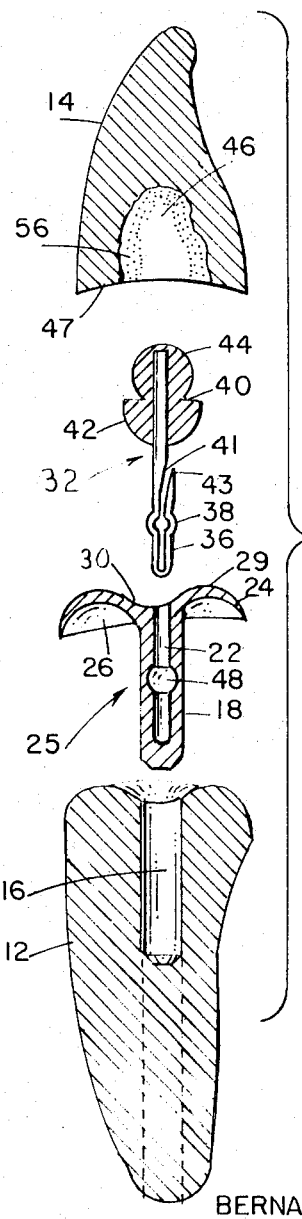
FIG. 3 is an exploded cross-sectional view depicting the components comprising the dental prosthetic construction of FIG. 2.
Figure 2:
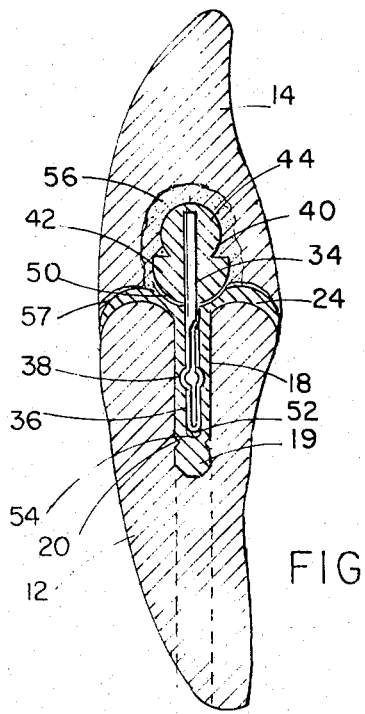
FIG. 2 is a cross-sectional view taken on the line 2—2 of FIG. 1.

Referring now to FIGS. 1 through 3 of the drawings, there is shown a first embodiment of the dental prosthetic construction 10 of the present invention. The construction 10 includes a tooth stub 12 to which a dental prosthetic structure 14, such as a false tooth, is secured. It is to be noted, however, that the structure 14 may also be secured directly to the jawbone by means of the apparatus of the present invention, as will appear more fully hereinafter, with reference to FIGS. 7 through 9. The dental prosthetic structure 14 may also comprise a bridge having a plurality of false teeth one or more of which may be secured to teeth stubs or the patient's jawbone.

The first step in the securement of the structure 14 to the tooth stub 12, is the drilling of a bore 16 to a predetermined desired depth in the prepared tooth stub 12, as best seen in FIG. 3. The diameter and depth of the bore 16 are selected to be substantially equal to the external diameter and length of a preformed hollow sleeve 18 formed of gold or any other suitable metal or material. As seen in FIG. 2, the sleeve 18 is formed with an external groove 20 at the lower end portion thereof which groove is positioned beyond, or below, the opening 22 formed in the sleeve. The length of sleeve 18 may be that shown in FIG. 2, or the lower portion 19 thereof may be severed at the groove 20 to reduce the length of the sleeve. Accordingly, the preformed sleeve 18 may be fabricated having a plurality of longitudinally spaced grooves 20 to vary the length thereof from a minimum to a maximum in predetermined discrete gradations. In this manner the depth of bore 16 selected or necessitated is also variable in fixed steps in dependence upon the gradations at the bottom of the sleeve 18.

After the drilling of bore 16 and the placing of the mating of sleeve 18 therein, as discussed above, the sleeve 18 is removed and a saddle 24 extending laterally therefrom and outwardly of the opening 22 is cast with the sleeve 18, such as by the well-known lost wax process to form an integral insert assembly, designated generally by the reference numeral 25. It is to be noted that the wax-up for the saddle 24 is formed with the sleeve 18 positioned within the bore 16. The configuration of the lower surface 26 of the saddle 24 is conformal with that of the peripheral surface 28 of the prepared tooth stub 12. The upper surface 29 of the saddle is cast having a central arcuate depression 30, as will be discussed more fully hereinafter. The apparatus of the construction includes a preformed intermediate joinder member 32 comprising a rod 34 having a reduced diameter lower portion which is bent over upon itself in spaced relationship to form a lower spring portion 36 having a bowed intermediate part 38. Secured to the upper end of rod 34 is an anchoring protuberance 40 having a lower hemispherical portion 42 and an upper knob-like portion 44 formed integrally with one another. The rod 34 is tapered as at 41 so that the thickness of the entire lower spring portion 36 is less than that of the upper part of the rod. Also, the upwardly turned end 43 of the spring portion 36 is tapered, whereby closure of the spring portion 36, or urging thereof against its normal resilient position, will cause the end 43 to seat against the tapered portion 41 of the rod 34.

In the formation of the wax impression to cast the insert assembly 25, and in particular the upper surface 29 of the saddle 24, the joinder member 32 is removably positioned within the opening 22 in sleeve 18 with the hemispherical portion 42 having a removable adhesively secured annular layer 45 on the outer surface thereof (see FIG. 5) whose purpose will be described hereinafter. The wax pattern (not shown) is formed having a depression which is conformal with that of the hemispherical portion 42 having the layer 45 thereon, whereby the cast upper surface 29 of saddle 24 is formed having the arcuate depression 30 conformal with the hemispherical portion 42 with the layer 45 secured thereon.

The false tooth 14, which as discussed hereinbefore, may be part of a dental prosthetic structure including a plurality of false teeth, has a central opening 46 drilled or otherwise formed in the bottom surface 47 thereof. The opening 46 is preferably formed having a somewhat irregular configuration and of a depth sufficient to accommodate the anchoring protuberance 40 which is secured therein by means of a self-curing resin, as described hereinafter. The peripheral configuration of the surface 47 is made conformal with that of the upper peripheral surface 29 of the saddle 24.

The opening 22 in the sleeve 18 is formed with a bowed intermediate portion 48 which is adapted to receive the bowed intermediate part 38 of the spring portion 36 of the intermediate joinder member 32, in a manner to be described in detail hereinafter.

In the fabrication of the construction 10, the insert assembly 25 is secured with respect to the bored and prepared tooth stub 12, such as by cementing. The adhesive layer 45 is then peeled and removed from the hemispherical portion 42 of the intermediate joinder member 32 to provide the structural configuration shown in FIGS. 2 and 3.

The lower spring portion 36 is then urged into the opening 22, wherein engagement of the bowed part 38 of the spring with the walls of the sleeve 18 at the proximal end of the opening causes the end 43 to seat against tapered portion 41. This reduces the effective width of the spring portion 36, and the bowed part 38, and permits the spring portion to be urged downwardly into the opening 22 until the bowed part 38 enters the bowed intermediate portion 48 of the opening. When this occurs the joinder member 32 is positionally secured with respect to the insert assembly 25. The length of the spring portion 36 and the depth of opening 22 are such that the distal end 52 of the spring portion is spaced from the distal end 54 of the opening 22 when the bowed part 38 is positioned within the bowed intermediate portion 48, as seen in FIG. 2. The anchoring protuberance 40 is then secured within the opening 46 by means of a self-curing resin layer 56, with the conformal peripheral surfaces 47 and 29 being in registry. The assembly comprising the joinder member 32 secured to the false tooth 14 is removed from the prepared tooth stub 12 and the upper peripheral surface 29 of the saddle is ground down to form a small vertical spacing 57 between the conformal but now non-registering surfaces 29 of the saddle and 47 of the false tooth 14. The spacing 57 is substantially the same as that of clearance space 50, approximately .010 of an inch.

The final construction 10 is shown in FIG. 2, from where it can be seen that the last step to complete the construction is the removal or peeling of the adhesive layer 45 secured to the hemispherical portion 42 which results in a clearance space 50 between the lower surface of the portion 42 and the surface of the depression 30 in the upper surface 29 of the saddle 24. The clearance space 50 is in the order of .010 of an inch and provides limited universal movement of the false tooth 14 so as to permit the construction 10 to resiliently withstand the forces imparted thereto during mastication. The spacer of .010 is calculated to the average sponginess and give of the mucosa under masticatory forces. It is contemplated that by reason of this clearance an equilibrium of resiliency will be achieved.

With particular reference now to FIGS. 4 through 6, there is shown a second or alternative embodiment of the present invention, wherein similar parts are denoted by similar reference numerals. In this embodiment, the opening 22a in sleeve 18a has the proximal end counterbored so as to be outwardly flared as at 58. The opening 22a has upper and lower opening portions 60 and 62, respectively, with the diameter of the lower opening portion 62 being smaller than that of the upper opening portion 60. The intermediate bowed portion 48a is interposed between the opening portions 60 and 62. The sleeve 18a also includes an annular flange 64 at the upper end thereof, the purpose of which is to provide a more secured anchoring for the casting of the saddle 24a to the sleeve 18a.

The intermediate joinder member 32a (FIG. 5) includes the anchoring protuberance 40a having an upper knob-like portion 44a and a lower hemispherical portion 42a, the latter having the removably secured adhesive layer 45 on the undersurface thereof. The layer 45 may be fabricated of an adhesive backed paper material or any other suitable material. The hemispherical portion 42a has a central cylindrical opening 66 formed in the bottom portion thereof.

A rod 34a having a substantially uniform cross-section throughout is equally bent over upon itself with the upper ends thereof being in abutting secured relationship within the anchoring protuberance 40a and the lower spring portion 36a extending downwardly therefrom. The upper arm members 68 of the spring portion 36a commence diverging away from each other within the opening 60 which ceases at the bowed part 38a, whereat the lower arm members 70 commence converging towards each other, terminating at the distal end 52a of the spring portion.

The construction 10a is fabricated in substantially the same manner disclosed with reference to the construction 10 of FIGS. 1 through 3. In this regard, the false tooth 14a is secured with respect to the tooth stub 12a by cementing the false tooth to the anchoring protuberance 40a by means of a self-curing resin layer 56a interposed between 40a and the opening 46a in the false tooth. After this has been accomplished the assembly comprising the joinder member 32a secured to the false tooth 14a is removed from the prepared tooth stub 12a and the upper peripheral surface 29a of the saddle 24a is ground down to form a small vertical spacing 72 between the conformed but now non-registering surfaces 29a of the saddle and 47a of the false tooth. The spacing 72 is preferably about equal to that of the clearance space 50a, i.e., approximately .010 of an inch.

The purpose of the vertical spacing 72 and of the clearance space 50a is to allow for resilient action under the forces imparted to the construction 10a during mastication. Thus, if an axial downward force is imparted to the false tooth 14a, it will move downwardly until the surfaces 29a and 47a are in registration. However, when the false tooth 14a moves downwardly, the lower spring portion 36a also commences a downward movement, permissible due to the fact that the distal end 52a of the spring portion is spaced from the distal end 54a of the opening 22a. When this occurs, the upper end of the wall of the opening portion 62 imparts a force upon the bowed part 38a of the spring causing it to contract as it moves downwardly and is displaced from the bowed portion 48a. Thus, the force imparted to the construction 10a is greatly reduced. As soon as the downward axial force on the false tooth 14a is removed, the bowed part 38a of spring portion 36a tends to expand and elevates itself as it again seats in bowed portion 48a and restores the construction to the configuration depicted in FIG. 4.

A third embodiment of the present invention is depicted in FIGS. 7 through 9, wherein similar parts are again denoted by similar reference numerals. In this embodiment, a sleeve 18b is employed for securing a dental prosthetic structure directly to the jawbone 74 of a patient. The sleeve includes externally disposed threads 76 and a flattened key member 78 formed integrally with the sleeve at the upper end thereof. The sleeve itself is hollow and has an opening 22b.

The sleeve 18b is screwed into the jawbone by turning the same by means of the key member 78, with the threads 76 threadedly engaging the bone structure. After the sleeve is secured, as shown in FIG. 9, the key member 78 is cut off the sleeve 18b along groove 80 to expose the mouth or proximal end of the opening 22b.

A joinder member and prosthetic structure (not shown) are then secured with respect to the sleeve 18b as described hereinabove in conjunction with the other embodiments of the invention.

While I have shown and discussed several preferred embodiments of my invention, it will be readily apparent to those skilled in the art that there are many modifications, changes and improvements which may be made therein without departing from the spirit and scope thereof as defined in the appended claims.

What is claimed is:

1. A dental prosthetic construction comprising a preformed hollow sleeve member adapted to be inserted and secured within a conformally shaped bore in a tooth stub or jawbone in a patient's mouth, said sleeve having a longitudinal opening, said opening having a bowed intermediate portion to define an enlarged space provided with a transverse dimension greater than transverse dimensions of adjacent portions of said opening, an intermediate joinder member provided with lower and upper end portions, said lower end portion of said intermediate joinder member being provided with spring means urgingly inserted into said opening, said spring means including bowed resilient means seated within said bowed intermediate portion of said opening to positonally secure sad intermediate joinder member with respect to said sleeve member, and said upper end portion of said intermediate joinder member including anchoring means for securement of said joinder member to a dental prosthetic structure.

2. A dental prosthetic construction in accordance with claim 1, wherein said spring means includes a rod member bent upon itself with said bowed means being an integral element thereof, said bowed means including spaced apart bowed portions of said rod member.

3. A dental prosthetic construction comprising a preformed hollow sleeve member adapted to be inserted and secured within a conformally shaped bore in a tooth stub or jawbone in a patient's mouth, said sleeve having a longitudinal opening and a closed distal end, said opening having a bowed intermediate portion, an intermediate joinder member, a dental prosthetic structure, the lower end portion of said intermediate joinder member being adapted to be urgingly inserted into said opening and including a bowed part adapted to be seated within said bowed intermediate portion of said opening to thereby positionally secure said intermediate joinder member with respect to said sleeve member, said upper end portion of said intermediate joinder member including anchoring means for securement of said joinder member to said dental prosthetic structure, said sleeve member including a saddle secured with the upper end thereof and extending laterally outward from the proximal end of said opening, said sleeve member and said saddle forming an insert assembly, the lower peripheral surface of said saddle being conformal with the peripheral surface of said bored tooth stub, said dental prosthetic structure having an opening formed in the bottom surface thereof, means for securing said anchoring means within said last-mentioned opening, The peripheral bottom surface of said dental prosthetic structure being substantially conformal with the peripheral upper surface of said saddle, said anchoring means including an upper knoblike member and a lower hemispherical member, said saddle including a central arcuate depression whose radius of curvature is substantially equal to that of said hemispherical member, and the lower surface of said hemispherical portion being slightly spaced from said arcuate depression to permit limited universal movement of said combination dental prosthetic structure and intermediate joinder member with respect to said tooth stub and insert assembly combination.

4. A dental prosthetic construction in accordance with claim 3, wherein said joinder member includes a rod member, the upper end of said rod member being secured to said anchoring means, and the lower end of said rod member forming a spring portion including said bowed part as an integral element extending intermediately thereof.

5. A dental prosthetic construction in accordance with claim 4, wherein said spring portion is formed by bending over the lower end of said rod member upon itself, and said distal end of said spring portion being spaced from the distal end of said opening when said spring portion is positioned and seated within said opening.

6. A dental prosthetic construction in accordance with claim 5, wherein the intermediate portion of said rod member is tapered, the upwardly turned extremity of said lower end of said rod being tapered and being adapted to seat in abutting nesting engagement with said tapered intermediate portion when said spring portion is urged against its normal resilient position.

7. A dental prosthetic construction in accordance with claim 3, wherein said sleeve member is formed having a laterally extending peripheral flange at the proximal end thereof, and said saddle is cast with said flanged proximal end of said sleeve member to form said insert assembly.

8. A dental prosthetic construction in accordance with claim 3, wherein said bottom peripheral surface of said dental prosthetic structure is slightly spaced from said upper peripheral surface of said saddle.

9. A dental prosthetic construction in accordance with claim 3, wherein
said intermediate joinder member includes a rod member,
said member being bent over upon itself with the upper ends thereof being secured to said anchoring means,
the lower end of said rod member comprising a spring portion including said bowed part as an integral element extending intermediately thereof.

10. A dental prosthetic construction in accordance with claim 9, wherein said proximal end of said opening is flared outwardly of the longitudinal axis of said opening.

11. A dental prosthetic structure in accordance with claim 9, wherein said lower peripheral surface of said hemispherical portion has an adhesive layer removably secured thereto.

12. A dental prosthetic structure in accordance with claim 11, wherein
said hemispherical portion includes an aperture centrally formed in the lower surface thereof, and
said spring portion of said rod member extends downwardly through said aperture.

13. A dental prosthetic construction comprising in combination,
a dental prosthetic structure,
an intermediate joinder member, and
an insert assembly,
said insert assembly comprising a hollow sleeve member having a saddle secured therewith and extending laterally from the proximal end of and outwardly of the opening in said sleeve member,
said insert assembly being adapted to be secured within a bore formed in a tooth stub,
said intermediate joinder member comprising an upper anchoring protuberance including a lower hemispherical portion and a lower spring portion,
means for securing said anchoring protuberance within said prosthetic structure,
said lower hemispherical portion having a removable adhesive layer secured to the undersurface thereof,
said lower spring portion being adapted to be removably positioned within said opening in said sleeve member,
said lower hemispherical portion of said intermediate joinder member having said adhesive layer removed therefrom being disposed immediately adjacent said saddle and slightly spaced therefrom, wherefore said intermediate joinder member having said prosthetic structure secured therewith is capable of limited universal movement with respect to said insert assembly and thus with respect to said tooth stub.

14. A dental prosthetic construction comprising a preformed hollow sleeve member adapted to be inserted and secured within a conformally shaped bore in a tooth stub or jawbone in a patient's mouth.
said sleeve having a longitudnial opening and a closed distal end,
said opening having a bowed intermediate portion,
an intermediate joinder member,
a dental prosthetic structure,
the lower end portion of said intermediate joinder member being adapted to be urgingly inserted into said opening and including a bowed part adapted to be seated within said bowed intermediate portion of said opening to thereby positionally secure said intermediate joinder member with respect to said sleeve member,
said upper end portion of said intermediate joinder member including anchoring means for securement of said joinder member to said dental prosthetic structure,
said hollow sleeve member being provided with a plurality of external threads thereon and including a key member formed integrally therewith at the proximal end thereof,
said sleeve being adapted to be threadedly secured to a patient's jawbone, and
said key member being adapted to be severed from the proximal end to expose the opening within said sleeve member.

15. A method of securing a dental prosthetic structure to an existing tooth stub or jawbone in a patient's mouth, comprising the steps of
preparing the existing tooth stub or jawbone by forming a bore therein,
securing a hollow sleeve defining a longitudinal opening therein in said bore,
said opening being formed with a bowed intermediate portion,
securing the upper end portion of an intermediate joinder member to said dental prosthetic structure,
urgingly inserting the lower end portion of said intermediate joinder member having a bowed part into said opening, and
seating said bowed part of said lower end portion within said bowed intermediate portion of said opening to thereby positionally secure said intermediate joinder member and dental prosthetic structure assembly with respect to said sleeve member.

16. A method in accordance with claim 15 including the steps of
forming a saddle secured to the upper end of said sleeve and extending laterally outward from the proximal end of said opening, and
forming the lower peripheral surface of said saddle conformally with the peripheral surface of said bored structure, and
said sleeve and saddle forming an integral insert assembly which is secured to said bored structure.

17. A method in accordance with claim 16 including the steps of
forming said intermediate joinder member to include an upper anchoring means and a lower spring portion,
said anchoring means including a lower hemispherical member, and
forming the upper surface of said saddle with a centrally disposed arcuate depression whose radius of curvature is substantially equal to that of said hemispherical member.

18. A method in accordance with claim 17 including the step of forming the upper peripheral surface of said saddle conformal with the bottom peripheral surface of said dental prosthetic structure.

19. A method in accordance with claim 18 including the step of providing a removable adhesive layer on the under surface of said hemispherical member and removing said layer when securing said dental prosthetic structure and intermediate joinder member assembly to said insert assembly, thereby providing a clearance space between said hemispherical member and said arcuate depression to provide limited universal movement of said dental prosthetic structure with respect to said insert assembly.

20. A method in accordance with claim 19 including the step of grinding down the upper peripheral surface of said saddle to provide a vertical clearance space between said surface and the substantially conformal bottom peripheral surface of said dental prosthetic structure.

21. A method in accordance with claim 15 including the steps of
providing said hollow sleeve with externally disposed threads, and
securing said sleeve within said bore by screwing said sleeve into said bore.

22. A method in accordance with claim 21 including the steps of
providing said threaded sleeve with a flattened key member at the upper end thereof by means of which said sleeve is screwed into said bore, and
severing said flattened key member from said sleeve after the same has been screwed into said bore to expose the opening in said sleeve.

References Cited
UNITED STATES PATENTS 1,517,500  2/1924  Frebericks _____ 32—13

FOREIGN PATENTS 869,398  7/1949  Germany.

ROBERT PESHOCK, Primary Examiner